(12) United States Patent
Alvarez et al.

(10) Patent No.: US 6,271,299 B1
(45) Date of Patent: *Aug. 7, 2001

(54) FIRE RESISTANT SEALANT COMPOSITION

(75) Inventors: Khristopher Edward Alvarez; Kiersten Lynn Shephard, both of Midland, MI (US)

(73) Assignee: Dow Corning Corporation, Midland, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 09/244,226

(22) Filed: Feb. 2, 1999

(51) Int. Cl.$^7$ ................................................ C08J 3/34
(52) U.S. Cl. ........................ 524/456; 524/791; 524/588
(58) Field of Search .................................. 524/456, 791, 524/588

(56) References Cited

U.S. PATENT DOCUMENTS

| | | | |
|---|---|---|---|
| 2,823,218 | 2/1958 | Speier et al. | 260/448.2 |
| 3,355,532 | 11/1967 | Bracht et al. | 264/234 |
| 3,445,320 | 5/1969 | Kookostsedes et al. | 260/37 |
| 3,817,910 | 6/1974 | Viksne et al. | 260/37 |
| 3,882,083 * | 5/1975 | Berger et al. | 528/15 |
| 4,102,852 | 7/1978 | DeLaTorre et al. | 260/37 |
| 4,389,496 * | 6/1983 | Leiisner et al. | 523/109 |
| 4,970,559 * | 11/1990 | Miyabayashi | 355/290 |
| 5,008,317 | 4/1991 | Wolfer et al. | 524/262 |
| 5,248,715 | 9/1993 | Gray et al. | 524/265 |
| 5,306,739 | 4/1994 | Lucey et al. | 522/42 |
| 5,364,921 | 11/1994 | Gray et al. | 528/15 |
| 6,051,642 | 4/2000 | Tkaczyk et al. | 524/444 |
| 6,084,002 * | 7/2000 | Nicholson et al. | 521/91 |

FOREIGN PATENT DOCUMENTS

| | | |
|---|---|---|
| 3439745 | 5/1985 | (DE) . |
| 0739947 | 10/1996 | (EP) . |
| 0902440 | 3/1999 | (EP) . |
| 09055125 | 2/1997 | (JP) . |
| WO 95/32245 | 5/1995 | (WO) . |

OTHER PUBLICATIONS

JP 09055125, abstract, Feb. 1997.*

* cited by examiner

*Primary Examiner*—Margaret G. Moore
(74) *Attorney, Agent, or Firm*—William F. Boley; Jennifer S. Warren

(57) ABSTRACT

Curable liquid silicone rubber compositions that are curable to form silicone elastomers which are useable as fire resistant sealants. These compositions have low heat release and form hard chars on burning, and comprise:

(A) a liquid polyorganosiloxane polymer described by the formula

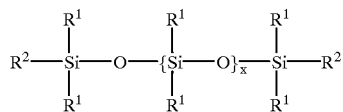

where each $R^1$ is independently selected from the group consisting of alkyl, alkenyl, aryl, and halogenated alkyl groups having from 1 to 18 carbon atoms, each $R^2$ is independently selected from the group consisting of hydroxyl, alkoxy, alkenyl, and alkynyl groups, and x is an integer having a value of from about 10 to 1500, (B) a cross-linking organosilicon compound having at least 3 silicon-bonded reactive groups, (C) a catalyst capable of promoting the reaction between the silicon-bonded $R^2$ groups of Component A and the silicon-bonded reactive group of Component B, (D) wollastonite, and (E) an optional reinforcing filler.

26 Claims, 1 Drawing Sheet

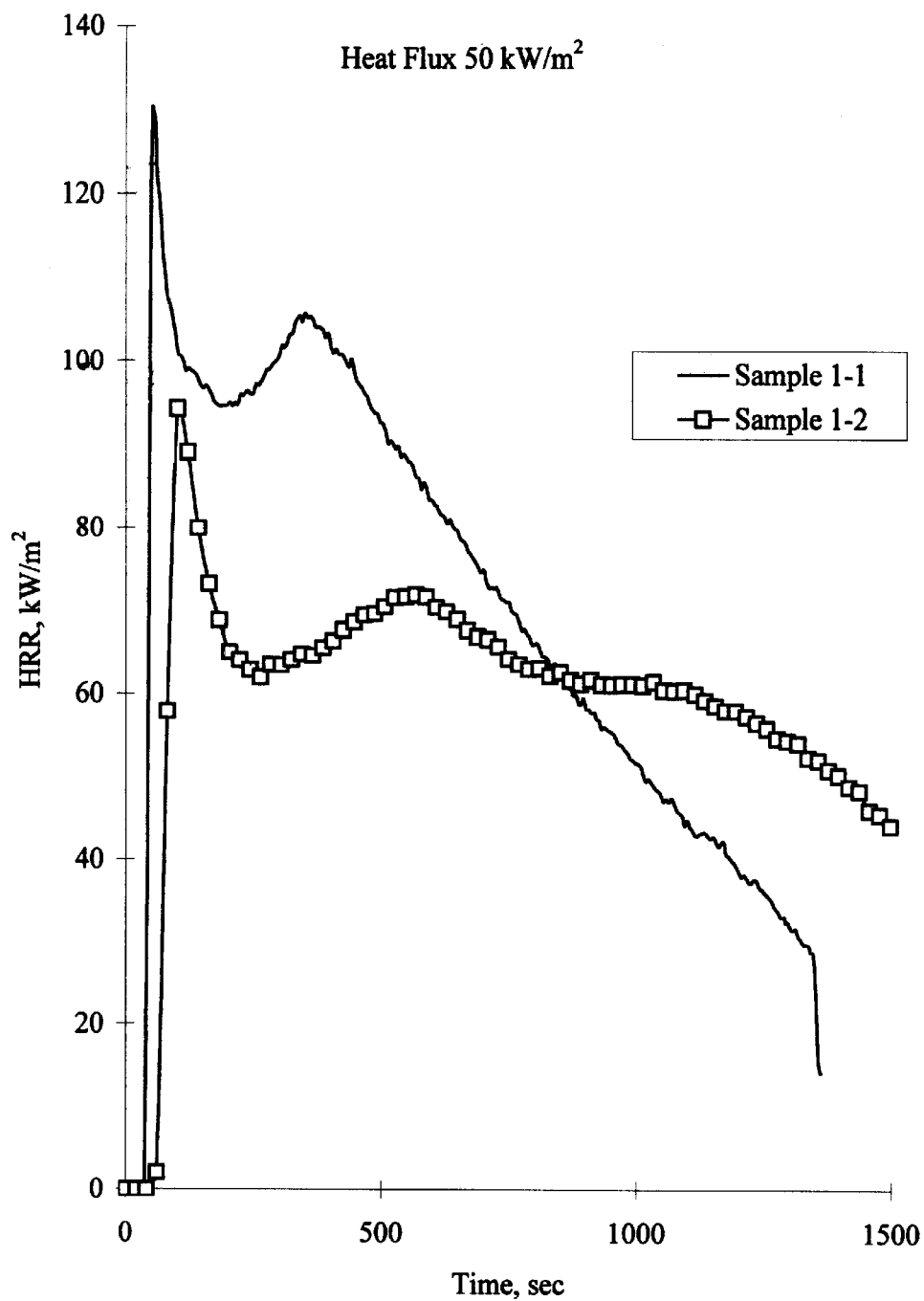
Figure 1. The HRR as a Function of Time for Model Elastomers.

FIRE RESISTANT SEALANT COMPOSITION

FIELD OF THE INVENTION

This invention is curable liquid silicone rubber compositions that are useful as fire resistant sealants.

BACKGROUND OF THE INVENTION

Organosiloxane compositions that cure to yield crosslinked silicone rubber sealants by the reaction of polyorganosiloxanes containing at least two reactive groups per molecule with organosilicon compounds containing at least three reactive groups per molecule as the crosslinker are known. The reactive ingredients of these compositions are typically packaged in two containers with the crosslinker in one container and a reaction catalyst in a second container. The curing reaction occurs when the contents of the two containers are mixed.

Many approaches to flame resistance depend on the addition of several ingredients, including oxide fillers and platinum. For example, Wolfer et al. in U.S. Pat. No. 5,008,317 describe flame retardant and arc resistant silicone elastomers which contain an additive obtained by mixing a vinyl-rich polydiorganosiloxane, a metal oxide selected from titanium dioxide, zirconium dioxide, zinc oxide, Ce(III) oxide, Ce(IV) oxide, platinum, and an organosilicon compound having a basic nitrogen bonded to the silicon. DeLaTorre et al. in U.S. Pat. No. 4,102,852, describe a self-extinguishing room temperature vulcanizable silicone rubber composition comprising a silanol end-stopped polydiorganosiloxane polymer, a metal oxide filler, an alkoxy functional cross-linking agent, carbon black, platinum, and a titanium chelate catalyst.

SUMMARY OF THE INVENTION

The present inventors have discovered that curable organosiloxane compositions comprising a liquid polyorganosiloxane having at least two reactive groups selected from the group consisting of an alkoxy, a hydroxy, an alkenyl or alkynyl group; crosslinking agent, catalyst, reinforcing filler, and wollastonite, cure to form silicone rubber sealants having unexpectedly improved fire resistance properties. These cured silicone rubber sealants have very low heat release and form hard char structures on burning. The compositions of the present invention are useful in sealing constructions to prevent the passage of flames and air and other vapors.

DESCRIPTION OF THE DRAWING

FIG. 1 shows the heat release rate (HRR) as a function of time for two liquid silicone rubber samples that were cured into test slabs and burned in a cone calorimeter at 50 kW/m². Each of the samples was formulated with about 10 volume percent inorganic filler. Sample 1-1was formulated with synthetic calcium silicate. Sample 1-2 was formulated with wollastonite.

DETAILED DESCRIPTION OF THE INVENTION

The present invention is a curable liquid silicone rubber composition, comprising (A) a liquid polyorganosiloxane polymer described by the formula

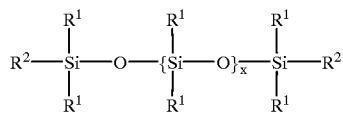

where each $R^1$ is independently selected from the group consisting of alkyl, aryl, alkenyl, and halogenated alkyl groups having from 1 to about 18 carbon atoms, each $R^2$ is independently selected from the group consisting of hydroxyl, alkoxy, alkenyl group, and alkynyl groups, and x has a value of from about 10 to about 1500, (B) a cross-linking organosilicon compound having at least 3 silicon-bonded reactive groups, (C) a catalyst capable of promoting the reaction between the silicon-bonded $R^2$ groups of Component (A) and the silicon-bonded reactive group of Component (B), (D) wollastonite, and (E) an optional reinforcing filler.

The curable liquid silicone rubber composition is able to form silicone elastomers upon curing that have excellent fire resistance.

The polyorganosiloxane polymers (A) for use in compositions of the present invention are pumpable liquids described by formula (I), where $R^1$ is an independently selected monovalent hydrocarbon group having from 1 to about 18 carbon atoms; each $R^2$ is selected from the group consisting of a hydroxyl, alkoxy, alkenyl, or alkynyl group; and x is an integer having a value of from about 10 to 1500. It is preferred that $R^1$ is an alkyl or aryl group having from 1 to about 8 carbon atoms, e.g. methyl, ethyl, propyl, isobutyl, hexyl, phenyl or octyl; an alkenyl group such as vinyl; or halogenated alkyl groups such as 3,3,3-trifluoropropyl. More preferably at least 50% of all $R^1$ groups are methyl groups, and most preferably substantially all $R^1$ groups are methyl groups. $R^2$ is selected based on the cure mechanism desired, whether condensation cure or addition cure. For condensation reactions, $R^2$ should be either a hydroxyl group or alkoxy group having up to 3 carbon atoms. For addition reactions $R^2$ is an alkenyl or alkynyl group, preferably having up to 8 carbon atoms, and more preferably vinyl, allyl or hexenyl.

When the present composition is to be cured by an addition reaction, then it is preferred that $R^2$ be alkenyl groups. Such polymers are well known in the art and may vary from viscous materials to freely flowing liquids. Preferred materials have a viscosity of not greater than 250 Pa·s. at 25° C., and more preferably a viscosity of about 0.1 to 100 Pa·s. at 25° C.

More preferably, when the present composition is to be cured by addition cure, $R^2$ denotes an alkenyl group having up to 8 carbon atoms, described by the formula —$R^3_y$—CH=$CH_2$, where $R^3$ denotes a divalent hydrocarbon group having up to 6 carbon atoms, preferably an alkylene group having up to 4 carbon atoms; y has a value of 0 or 1; and x has a value of from about 10 to 1500, preferably about 50 to 1200, most preferably about 70 to 800. It is most preferred that polydiorganosiloxane (A) be an α,ω-vinyldimethylsiloxy-endblocked polydimethylsiloxane polymer having a viscosity at 25° C. from about 50 to 250,000 mPa·s, more preferably about 100 to 100,000 mPa·s, and most preferably about 250 to 60,000 mPa-s.

When the present composition is to be cured by condensation reaction, it is preferable that $R^2$ in formula (I) be selected from hydroxy and alkoxy groups, and x preferably has a value of from about 50 to 1200, and most preferably about 70 to 800. An example of a polymer suitable for condensation cure is an α,ω-dimethylhydroxysiloxy-endblocked polydimethylsiloxane polymer having a viscosity of from about 50 to 250,000 mPa·s at 25° C.

The cross-linking organosilicon compound (B) is capable of reacting with Component (A) above. Suitable organosilicon compounds are well known in the art. Component (B) may vary from a viscous material to a freely flowing liquid. Preferred materials have a viscosity of not greater than 500 mPa·s at 25° C., more preferably 2 to 55 mPa·s at 25° C. Component (B) may be a monomer, a homopolymer, a copolymer or mixtures thereof which comprise at least one unit of the general formula $R^4_aR^5_bSiO_{4-a-b/2}$ wherein $R^4$ is selected from the group consisting of alkyl, aryl, and halogenated alkyl groups having from 1 to about 18 carbon atoms, a has a value of 0 or 1, b has a value of from 2 to 3, the sum of a+b being no more than 3, and $R^5$ is a reactive group. Each molecule of Component (B) has at least 3 silicon-bonded substituents $R^5$ which are capable of reacting with the silicon-bonded group $R^2$ of Component (A). $R^5$ is selected from the group consisting of hydrogen, hydroxy, and alkoxy, based on the cure mechanism as described herein.

Component (B) is preferably selected from the group consisting of silanes, low molecular weight organosilicon resins and short chain organosiloxane polymers. Suitable silanes which may serve as cross-linking organosilicon compounds include alkyltrialkoxy silane, e.g. methyltrimethoxy silane, ethyltrimethoxy silane, methyltriethoxy silane or methyltrihydrosilane. Suitable organosilicon resin compounds for Component (B) include organosilicon resins consisting mainly of tetrafuctional siloxane units of the formula $SiO_{4/2}$ and monofunctional units of the formula $R^4_aR^5_bSiO_{1/2}$, wherein $R^4$, $R^5$, a and b are as defined above; or resins consisting mainly of trifunctional units of the formula $R^5SiO_{3/2}$ and monofunctional units. Suitable short chain organosiloxane polymers include short chain polyorganosiloxanes having at least 3 silicon-bonded alkoxy, hydroxyl or hydrogen atoms per molecule, such as trimethyl siloxy end-blocked polymethylhydrosiloxane having up to about 20 carbon atoms, and silanol end-terminated dimethyl-methylsilanol siloxane copolymers.

When the group $R^2$ in Component (A) is a hydroxyl or an alkoxy group, it is preferred that the reactive substituents on the cross-linking organosilicon compound are either alkoxy groups or hydroxyl groups, allowing a condensation reaction to take place between the two components. When the group $R^2$ of polyorganosiloxane (A) is hydroxyl or an alkenyl group, the reactive substituents $R^5$ on the cross-linking organosilicon material may be hydrogen atoms, allowing either condensation or addition reaction between the cross-linking organosilicon material and the polyorganosiloxane polymer (A). More preferably for addition cure, when $R^2$ is an alkenyl group, Component (B) is preferably a short chain polyorganosiloxane having at least 3 silicon-bonded hydrogen atoms.

Preferred compounds for Component (B) when addition cure is desired are organosilicon compounds having the general formulae (II) or (III).

$$R^7R^6_2SiO(R^6_2SiO)_p(R^6HSiO)_qSiR^6_2R^7 \quad (II)$$

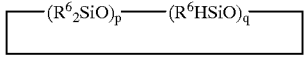  (III)

wherein $R^6$ denotes an alkyl or aryl group having up to 10 carbon atoms, or halogenated alkyl groups such as 3,3,3-trifluoropropyl; $R^7$ is $R^6$ or a hydrogen atom, p has a value of from 0 to about 20, q has a value of from 1 to about 70, and there are at least 3 silicon-bonded hydrogen atoms present per molecule. It is preferred that $R^6$ is a lower alkyl group having no more than 3 carbon atoms, most preferably a methyl group. Most preferably, in formula II, p and q have similar values or p=0 and q has a value of from 6 to 70, more preferably 20 to 60. When cyclic organosilicon materials, as in Fomula (III) are used, preferably, p and q have similar values or p=0 and q has a value of from 3 to 8. Component (B) may comprise a mixture of several organosilicon compounds as described.

Another preferred compound for Component (B) when addition cure is desired are compounds of the formula $(HSiO)_3SiR^6$, where $R^6$ is as defined above.

Component (B) is used in amounts which are conventionally used for making curable liquid silicone rubber compositions. The amounts used will vary depending upon the particular crosslinker chosen and the properties desired. Preferably, for a condensation-cured composition, the crosslinker is present in amounts of from about 0.5 to 15 parts by weight per 100 parts by weight of Component (A).

In order to obtain a high-quality cured product using addition cure, the molar ratio of the total silicon-bonded hydrogen in Component (B) to the silicon-bonded alkenyl groups provided by Component (A) preferably falls in the range of 1:5 to 5:1. Even more preferably, Component (B) is added at a concentration sufficient to provide a molar ratio of silicon-bonded hydrogen to silicon-bonded alkenyl provided by Component (A) is in the range of about 1:1 to 2.5:1.

The catalyst (C) may be any compound which catalyzes the reaction between Components (A) and (B). When the present composition is to be cured by condensation reaction, the catalyst may be any of the known condensation catalysts, such as those catalysts based on tin or titanium. Useful organotin compounds are those where the valence of the tin is either +2 or +4. These tin compounds are known in the art to promote the reaction between alkoxy groups substituted on silicon and hydroxyl groups substituted on silicon. Typical tin compounds useful as condensation catalysts include stannous salts of carboxylic acids such as stannous stearate, stannous oleate, stannous naphthanate, stannous hexoate, stannous succinate, stannous caprylate, and stannous octoate; and stannic salts of carboxylic acids, such as dibutyltindilaurate, dibutyltindiacetate, dibutyltindioctoate, dibutyltindiformate, and dibutyltindineodecanoate, as well as partial hydrolysis products of the above. For the purposes of the present invention, dibutyltindilaurate, dimethyltindineodecanoate, and stannous octoate are preferred catalysts. It is particularly surprising that the compositions of the present invention, when cured and tested by burning, have good heat release and char formation in the presence of tin catalysts, which can sometimes cause reversion of polyorganosiloxanes under high temperature.

Particularly useful titanium-based catalysts, useful as catalysts in the present composition, have organic groups attached to titanium through a titanium-oxygen-carbon linkage. The main types of such titanium-based compounds are ortho-esters, such as alcoholates and acylates in which the organic group is derived from a carboxylic acid. The organotitanium catalyst may also contain both types of the aforementioned groups attached to the same titanium atom. Operative titanium-based catalysts thus include those of the formula $Ti(OR^8)_4$ where $R^8$ is alkyl, alkoxyalkyl or acyl, for example tetraisopropyl titanate, tetramethoxyethoxytitanate and di-isopropyl diacetoxytitanate. The preferred organo-titanium catalysts for use in the present composition are the chelated or partially chelated titanium compounds. These materials are produced, for example by reacting an alcoholate as referred to above with an α- or β-diketone or a derivative thereof.

Component (C) is used in an amount sufficient to crosslink the present silicone rubber composition within a desired time, this amount typically being determined by routine experimentation. Generally, condensation catalysts are added at a level of about 0.01 to 10 parts by weight, preferably 0.1 to 5 parts by weight, for each 100 parts by weight of Component (A).

In the present invention, suitable addition catalysts include platinum group metal-based catalyst such as rhodium, ruthenium, palladium, osmium, irridium or platinum containing catalysts. Platinum-based catalysts are particularly preferred and may take any of the known forms, ranging from platinum deposited onto carriers, for example powdered charcoal, to platinic chloride, salts of platinum, chloroplatinic acids, and encapsulated forms thereof A preferred form of platinum catalyst is chloroplatinic acid, platinum acetylacetonate, complexes of platinous halides with unsaturated compounds such as ethylene, propylene, organovinylsiloxanes, and styrene; hexamethyldiplatinum, $PtCl_2$, $PtCl_3$, $PtCl_4$, and $Pt(CN)_3$. The preferred platinum-based catalyst is a form of chloroplatinic acid, either as the commonly available hexa-hydrate form or in its anhydrous form, as taught in U.S. Pat. No. 2,823,218. A more preferred platinum-based catalyst is the composition that is obtained when chloroplatinic acid is reacted with an alkenyl organosilicon compound such as divinyltetramethyldisiloxane, as disclosed in U.S. Pat. No. 3,419,593. The effective amount of platinum-based catalyst is an amount giving from about 0.1 to 1000 parts by weight per million parts by weight of the total composition. It is preferred that the platinum-based catalyst (C) is employed in an amount giving from 2 to 100 ppm by weight of platinum metal based on the total weight of the composition, more preferably 5 to 50 ppm.

When the compositions of the present invention are to be cured by addition reaction, mixtures of Components (A), (B), and (C) may begin to cure at ambient temperature. To obtain a longer working time or "pot life", the activity of the catalyst under ambient conditions can be retarded or suppressed by addition of a suitable inhibitor.

Known platinum group metal catalyst inhibitors include the acetylenic compounds disclosed in U.S. Pat. No. 3,445,420, to Kookootsedes et al. Acetylenic alcohols such as 2-methyl-3-butyn-2-ol and 1-ethynyl-2-cyclohexanol constitute a preferred class of inhibitors that suppress the activity of a platinum-based catalyst at 25° C. Compositions containing these catalysts typically require heating at temperatures of 70° C. or above to cure at a practical rate. Room temperature cure is typically accomplished with such systems by use of a two-part system in which the crosslinker and inhibitor are in one of the two parts and the platinum is in the other part. The amount of platinum is increased to allow for curing at room temperature.

Inhibitor concentrations as low as one mole of inhibitor per mole of platinum group metal will in some instances imPart satisfactory storage stability and cure rate. In other instances inhibitor concentrations of up to 500 or more moles of inhibitor per mole of platinum group metal are required. The optimum concentration for a given inhibitor in a given composition can readily be determined by routine experimentation.

Component (D) is wollastonite. Preferred is when Component (D) is 7 to 70 weight percent, based on the weight of the composition, of wollastonite having an average particle size of 2 to 30 μm. Wollastonite, also known as calcium metasilicate, is a naturally occurring mineral. The wollastonite used in this invention is a mined form, having an acicular morphology, that is a needle-like shape. Typically, wollastonite has an aspect ratio (length to diameter) of "having an average particle size of 2 to 30 μm"3:1 to 30:1. It is preferred that the wollastonite have an average particle size of from about 5 to 15 μm and an aspect ratio greater than about 15:1. Compositions using calcium silicates of other shapes and morphologies than wollastonite do not exhibit the char formation or low heat release rates of those of the present invention. For example, a composition made with synthetic calcium, which typically has a spherical shape, is shown in the examples below not to have the desired fire performance. Preferred wollastonite is supplied in various grades by NYCO® Minerals, Inc., Willsboro N.Y. Compositions containing less than about 7 weight percent wollastonite do not exhibit the char formation and low heat release rate of the present invention. The upper limit of wollastonite that is useful will depend on the properties desired in the uncured and cured composition. Generally, wollastonite present in the composition at greater than about 70 percent by weight results in uncured compositions that are too stiff and therefore difficult to process, and results in cured compositions that have reduced tensile strength and elongation.

Component (E) is an optional reinforcing filler, which is preferably hydrophobic. While compositions of the present invention can be made with Components (A), (B), (C) and (D), use of Component (E) improves properties such as tensile and elongation in cured compositions. The amount of Component (E) in the present compositions is in part determined by the physical properties desired in the cured rubber, and in part determined by the viscosity of the uncured composition. Liquid or pumPable silicone compositions typically contain from about 10 to about 60 percent by weight reinforcing filler. Preferably, in the present composition, reinforcing filler is present at about 10 to 25 weight percent, based on the total composition. Examples. of suitable fillers include silica, titanium dioxide, aluminum silicates, and organosilicon resins. Preferred are silica fillers, most preferably fumed or precipitated silica fillers, as they have the best reinforcing properties. The average particle size of these fillers may be such that the diameter ranges from about 0.1 to 20 μm, preferably from about 0.2 to 5 μm, and most preferably 0.4 to 2.5 μm.

The surface of the filler particles is preferably rendered hydrophobic in order to make the filer more comPatible with the present compositions. Rendering the filler particles hydrophobic may be done either prior to or after dispersing the filler particles in the polyorganosiloxane polymer. Hydrophobing can be effected by pre-treatment of the filler particles with fatty acids, reactive silanes or reactive siloxanes. Examples of suitable hydrophobing agents include stearic acid, dimethyldichlorosilane, trimethylchlorosilane, hexamethyldisilazane, hydroxyl end-blocked or methyl end-blocked polydimethylsiloxanes, siloxane resins or mixtures of two or more of these. Other hydrophobing agents may also be used, but the above exemplified materials are the most effective. Fillers which have already been treated with such compounds are commercially available from a number of sources. Alternatively, the surface of the filler may be rendered hydrophobic in situ, after the filler has been dispersed in the polyorganosiloxane polymer. Hydrophobing may be effected by adding to the polysiloxane polymer component prior to, during, or after the dispersion of the filler, an appropriate amount of a hydrophobing agent of the kind described above as reactive silanes, siloxanes or fatty acids, and heating the mixture sufficiently to cause reaction, for example to a temperature of at least 40° C. The quantity of hydrophobing agent employed will depend for example on the nature of the agent and of the filler, and will be evident or ascertainable by those skilled in the art. Sufficient hydrophobic agent should be used to provide the filler with at least a discernible degree of hydrophobicity.

Silicone resins may also be used as a filler in the present composition. Preferred is a MQ type resin, that is a resin consisting of monovalent siloxane units M and tetravalent siloxane units Q and preferably a resin consisting essentially of M units $R^2R^1_2SiO_{1/2}$ and $R^1_3SiO1/2$, and Q units $SiO_{4/2}$, in which $R^1$ and $R^2$ are as defined above. Preferably in the MQ resin, $R^2$ is a vinyl group, there being no more than 10 percent by weight of vinyl groups per molecule more preferably 1 to 5 percent by weight of vinyl groups per molecule. The resin may be in solid or liquid form although we prefer the ratio of the units M to the units Q to be such that the resin is a solid at ambient temperature and pressure.

The present compositions may contain additional ingredients to modify the properties of the curable compositions or cured silicone rubber prepared from the compositions. These additional ingredients include but are not limited to liquid diluents, additional non-reinforcing fillers such as diatomaceous earth, quartz, and calcium carbonate, adhesion promoters, surfactants, stabilizers to inhibit degradation in the presence of heat and/or ultraviolet light, dyes, pigments, working time extenders and flame retardants. Non-reactive polyorganosiloxanes are a preferred class of diluents. The preferred non-reactive polyorganosiloxane diluent is trimethylsiloxy-terminated dimethylsiloxane. Compositions of the present invention may also contain small amounts of water. In order to function as sealants, it is preferable that the compositions contain an adhesion promoter. Adhesion promoters for use with silicone sealants are well known in the art. Useful adhesion promotors for addition cure sealants are selected from organofunctional silane compounds such as glycidoxypropyltimethoxysilane, gamma-aminopropyltriethoxysilane, and (ethylenediaminepropyl) triethoxysilane. When the composition is cured by addition cure, preferred compositions are aluminum chealates, epoxytrialkoxysilanes, tetraallkyltitante, alkylpolysilicates, and mixtures thereof, such as those described by Gray, et al. in U.S. Pat. No. 5,248,715 and Gray et al. in U.S. Pat. No. 5,365,921, which are hereby incorporated for reference.

The present composition may be in the form of a two part system, and is prepared by preparing a Part A and a Part B. One of the two parts contains Component (B) and the other part contains Component (C). Curing begins when Part A and Part B are mixed. When the compositions of the present invention are prepared using a Part A and a Part B, the mix ratio can vary, depending upon the formulation of each part, from about 1:1 to about 40:1, parts base per part curing agent. Typical mix ratios are 1:1, 10:1, and 20:1. Complete cure of the present composition requires from several minutes to several hours, depending upon, among other things, the type and concentration of crosslinker and the type and concentration of catalyst. The cure of the composition can be accelerated by heating the composition.

The present compositions are suitable for use as sealants in fire wall constructions.

EXAMPLES

The following examples describe preferred curable compositions of the present invention, and should not be interpreted as limiting the invention defined in the accompanying claims.

Unless otherwise indicated all parts and percentages in the examples are by weight and viscosities are the values measured at 25° C.

Test Methods

Fire Test 1

Stainless Steel 15.24×15.24×0.635 cm test plates containing a 10.16×0.635 cm slot open to the opposite side were used to measure flame retardancy of cured organosiloxane compositions. Sample compositions were prepared by hand mixing a Part A and a Part B as described below at a 10:1 weight part ratio, and de-airing at 84.75×0.635 kPa for 10 minutes. The composition was applied by drawing a bead with a 1.905×0.635 cm (width×height) half sphere on the bottom of the metal plate, with the sealant covering the slot. All samples were allowed to cure for 7 days at room temperature.

To test the fire resistance, each sample was placed at a 45° angle under a Bunsen Burner at 2000° F., for 15 minutes. A thermocouple was placed in the flame at the surface of the sample and another on the back side of the sample, accessible through the slot. During this test, temperature measurements of the flame and the back side temperature of the sample were taken every two minutes for fifteen minutes or until the flame reached the back side of the sample. After the 15 minutes, the flame was taken away and the time was recorded until it self extinguished. The sample passed the test if after 15 minutes there was no flame observed on the backside of the stainless steel plate and when the flame was removed the sample did not continue to burn for more than 30 seconds. After cooling at room temperature the burned sample was observed for integrity.

Fire Test 2

Stainless Steel 15.24×15.24×0.635 cm test plates containing a 10.16×0.635 cm crevice were used to measure flame retardancy of cured organosiloxane compositions. Sample compositions were prepared by hand mixing 10:1 Part A: Part B, and de-airing at 84.75 kPa for 10 minutes. Material was applied by drawing a bead of sample with a 1.905× 0.635 cm (width×height) half sphere on the bottom of metal plate. The samples were allowed to cure for 7 days at room temperature. The plate containing the cured material was placed in a vice 15.2 cm from an oxy-acetylene torch. The amount of time required for the flame to penetrate the sample and become visible on the back side of the stainless steel plate was recorded. The flame was removed when the flame penetrated the sample. After cooling, the burned sample was observed for integrity.

Fire Test 3

Heat release rates of cured organosiloxane compositions were determined by a cone calorimeter. In the cone calorimeter, a conical electrical bumer is positioned above the sample to emit a defined heat flux towards the sample. A spark igniter is situated above the sample's surface and used to ignite the volatile gasses being distilled from the sample. When the volatiles ignite, the time until ignition is recorded and the spark igniter is turned off. The oxygen concentration as a function of time is measured to determine the heat release rate. This is based on the principle that, for most plastics, a constant amount of heat is released per unit mass of oxygen consumed in combustion. This calorimeter is an oxygen consumption calorimeter, ASTM E1354. Given that the oxygen concentrations are far more easily determined than the heat output over time, the oxygen consumption calorimeter provides an easy way to determine the heat release rate of materials.

The dimensions of the cured organosiloxane composition samples were 0.10 m×0.10 m×6.3 mm. The samples were tested in a horizontal configuration in a metal frame, described in ASTM E1354, to prohibit the samples from curling upward. The external heat flux was 50 kW/m². Heat release rate, HRR, was calculated as a function of oxygen consumption.

Example 1

Liquid silicone rubber composition samples were compounded and cured to demonstrate the effect of wollastonite compared to a synthetic calcium silicate, (Celite C, World Minerals Inc., Lompoc, Calif. with a B.E.T. surface area of 175 m²/g) on the fire performance. The amount of either wollastonite or calcium silicate in each sample was 10 volume percent. Volume percent was used to assure that the same volume of silicone rubber fuel is available for each test sample. The silicone rubber composition consisted of a dimethylvinylsiloxy-terminated dimethyl siloxane, with a average degree of polymerization (dp) of 434, a trimethylsilyl-endcapped polymethylhydrogensiloxane with an average dp of 65 as a crosslinker, and a platinum catalyst. The ratio of SiH to Si-vinyl was held constant at 1.5:1.0 and the amount of Pt was 3 ppm. The compositions were mixed using a Vacuum Power Mixer Plus from Whip Mix® Corporation, Louisville, Kentucky, and then cured samples were prepared by curing at 170° C. for 15 min in a configuration appropriate for testing. The cured samples were tested in the cone calorimeter at a heat flux of 50 kW/m². The Heat Release Rate (HRR) data as a function of time is present in FIG. 1. Sample 1-1 contains a synthetic calcium silicate while Sample 1-2 contains wollastonite. Sample 1-2 has a higher heat release rate and a higher weight loss of 28% compared to 20%. The char structure of Sample 1-1 is also quite friable.

Example 2

Liquid silicone rubber compositions using addition cure were formulated for testing for fire performance. Part A was prepared by mixing the ingredients in a high shear, vertical charge mixer. Part B was prepared by mixing the ingredients in closed container on a roller. Example 2-1, containing no wollastonite was used as a comparison. It was mixed with a weight ratio of Part A to Part B of 1:1. Example 2-2, containing wollastonite was mixed with 10 Parts by weight A for 1 part by weight Part B. The compositions of the two materials are as follows. All parts are parts by weight.

| 2-1 Part A | |
|---|---|
| 79.3 parts | dimethylvinylsiloxy-terminated dimethylsiloxane with a viscosity of approximately 55,000 mm²/s |
| 0.3 parts | Platinum complex with polydimethyl siloxane containing 0.5% platinum metal by weight |
| 15.0 parts | hexamethyldisilazane treated fumed silica |
| 0.2 parts | tetrabutyltitanate |
| 0.2 parts | trimethylopropane diallyl ether |

| 2-1 Part B | |
|---|---|
| 76 parts | dimethlyvinylsiloxy-terminated dimethylsiloxane with a viscosity of approximately 55,000 mm²/s |
| 14.2 parts | hexamethyldisilazane treated fumed silica |
| 2.3 parts | trimethylsiloxy-terminated polydiorganosiloxane having an average of five methylhydrogensiloxane units and three dimethylsiloxane units per molecule with a silicon-bonded hydrogen atom content of about 0.75 weight percent |
| 2.4 parts | n-propyl orthosilicate |
| 0.5 parts | Glycidoxypropyltrimethoxysilane |
| 0.02 parts | of a mixture containing 97% of dimethylvinylsiloxy-terminated dimethylsiloxane copolymer and 3% ethynyl cyclohexanol |

| 2-2 Part A | |
|---|---|
| 73.8 parts | dimethlyvinylsiloxy-terminated dimethylsiloxane with a viscosity of approximately 2,000 mm²/s |
| 10 parts | hexamethyldisilazane treated fumed silica |
| 15 parts | wollastonite |
| 0.9 parts | Platinum polydimethyl siloxane complex containing 0.5% platinum metal by weight |

| 2-2 Part B | |
|---|---|
| 73 parts | dimethlyvinylsiloxy-terminated dimethylsiloxane with a viscosity of approximately 2,000 mm²/s |
| 11 parts | trimethylsiloxy-terminated polydiorganosiloxane having an average of five methylhydrogensiloxane units and three dimethylsiloxane units per molecule with a silicon-bonded hydrogen atom content of about 0.75 weight percent |

TABLE 2

Fire Performance of Samples 2-1 and 2-2.

| Sample | Fire Test 1 | Fire Test 2 burn through time, s | Fire Test 3 peak heat release rate, kW/m² | Fire Test 3 weight loss after burning, % |
|---|---|---|---|---|
| 2-1 | Failed | * | 146 | 36 |
| 2-2 | Passed | 245 | 126 | 29 |

*not tested since the sample failed so quickly in Fire Test 1.

Sample 2-2 had a hard ceramified char structure after burning which was not seen in 2-1.

Example 3

The lower limit of the amount of wollastonite in the curable silicone rubber composition. was determined in the next set of experiments. Example 2-2 was used as a benchmark for the wollastonite filled sealant. The entire formulation was kept constant except for the level of wollastonite was decreased in increments that were counter increased in the level of dimethlyvinylsiloxy-terminated dimethylsiloxane. Part A of Sample 3-1 contained 8 wt. % wollastonite, giving a wollastonite concentration of 7.3% for the total composition. At this level of wollastonite, Sample 3-1 had a slightly decreased fire performance which is seen in Table 3.

TABLE 3

Fire Performance of Samples 3-1 and 3-2.

| Sample | Fire Test 1 | Fire Test 2 burn through time, s | Fire Test 3 peak heat release rate, kW/m² | Fire Test 3 weight loss after burning, % |
|---|---|---|---|---|
| 2-2 | Passed | 245 | 126 | 29 |
| 3-1 | Failed | 90 | 143 | 31 |

Example 4

A typical addition cure silicone sealant using a tin catalyst, Sample 4-1, was evaluated for fire performance using Fire Test 3. Sample 4-2 was formulated with wollastonite in place of calcium carbonate. The formulations are as follows, with all parts as parts by weight.

Ten parts by weight of Part A were mixed with 1 part by weight of Part B.

4-1 Part A

| | |
|---|---|
| 1.4 parts | silanol terminated dimethylsiloxane with a viscosity of 41 mm²/s |
| 46.5 parts | treated precipitated calcium carbonate |
| 52.1 parts | partially alkyl end capped dimethylsiloxane silanol functional polymer with a viscosity of approximately 10,000 mm²/s |

4-1 Part B

| | |
|---|---|
| 0.2 part | dimethyl tin dineodecanoate |
| 1.5 parts | trimethyl treated fumed silica |
| 50.1 parts | silanol terminated dimethylsiloxane with a viscosity of 350 mm²/s |
| 16.1 parts | Carbon Black |
| 7.9 parts | Glycidoxypropyltrimethoxysilane |
| 7.0 parts | Gamma-aminopropyltrimethoxysilane |
| 17.2 parts | methyltrimethoxysilane |

4-2 Part A

Similar to 4-1 Part A except the treated precipitated calcium carbonate was replaced with wollastonite.

4-2 Part B

Same formulation as 4-1 Part B

Samples 4-1 and 4-2 were tested in the cone calorimeter to determine the heat release rate which can be seen in Table 4. By replacing the calcium carbonate with wollastonite there was a significant reduction in the heat release rate and a decrease in the amount of polymer that was consumed during the fire.

TABLE 4

Fire Performance of Examples 4-1 and 4-2.

| Sample | Fire Test 3 peak heat release rate, kW/m² | Fire Test 3 weight loss after burning, % |
|---|---|---|
| 4-1 | 103 | 23 |
| 4-2 | 85 | 18 |

We claim:

1. A curable liquid silicone rubber composition comprising (A) a liquid polyorganosiloxane polymer described by the formula

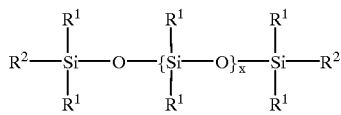

where each $R^1$ is independently selected from the group consisting of alkyl, alkenyl, aryl, and halogenated alkyl groups having from 1 to 18 carbon atoms, each $R^2$ is independently selected from the group consisting of hydroxyl, alkoxy, alkenyl, and alkynyl groups, and x is an integer having a value of from about 10 to 1500, (B) a cross-linking organosilicon compound having at least 3 silicon-bonded reactive groups, (C) a catalyst capable of promoting the reaction between the silicon-bonded $R^2$ groups of Component A and the silicon-bonded reactive group of Component B, (D) wollastonite "having an average particle size of 2 to 30 μm".

2. The composition of claim 1, where at least 50% of all $R^1$ groups are methyl groups.

3. The composition of claim 1, where each $R^2$ is independently selected from the group consisting of vinyl, allyl, and hexenyl groups.

4. The composition of claim 1, where Component (A) comprises an α,ω-dimethylvinylsiloxy polydimethylsiloxane polymer having a viscosity of from about 50 to 250,000 mPa·s at 25° C.

5. The composition of claim 1, where each $R^2$ is independently selected from the group consisting of hydroxy groups and alkoxy groups.

6. The composition of claim 1, where Component (A) comprises an α,ω-hydroxy end-terminated polydimethylsiloxane polymer having a viscosity of from 50 to 250,000 mPa·s at 25° C.

7. The composition of claim 1, where Component (B) comprises at least one unit of the general formula $R^4_aR^5_bSiO_{4-a-b/2}$ wherein $R^4$ is an alkyl or aryl group having from 1 to about 8 carbon atoms, a has a value of 0 or 1, b has a value of from 2 to 3, the sum of a+b being no more than 3, and $R^5$ is selected from the group consisting of a hydrogen atom, a hydroxyl and an alkoxy group.

8. The composition of claim 7 where $R^5$ is selected from the group consisting of a hydroxyl and an alkoxy group.

9. The composition of claim 7 where $R^5$ is a hydrogen atom.

10. The composition of claim 1 where (B) is selected from the group consisting of methyltrimethoxysilane, ethyltrimethoxysilane, and methyltriethoxysilane.

11. The composition of claim 1 where (B) is a short chain polyorganosiloxane having at least 3 silicon-bonded reactive group per molecule selected from the group consisting of a hydrogen, hydroxyl and alkoxy group.

12. The composition of claim 1 where (B) is selected from the group consisting of compounds described by

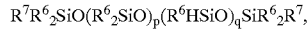

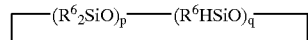

, and $(HSiO)_3SR^6$, where $R^6$ denotes an alkyl or aryl group having up to about 10 carbon atoms, $R^7$ is a group $R^6$ or a hydrogen atom, p has a value of from 0 to about 20, q has a value of from 1 to about 70, and there are at least 3 silicon-bonded hydrogen atoms present per molecule.

13. The composition of claim 1 where Component (C) is a condensation catalyst selected from the group consisting of tin compounds and titanium compounds.

14. The composition of claim 13 where Component (C) is selected from the group consisting of dialkyltin dicarboxylic acids and tetralkyl titanates.

15. The composition of claim 1 where Component (C) a platinum group metal based catalyst.

16. The composition of claim 15 where Component (C) is selected from the group consisting of chloroplatinic acid, platinum acetylacetonate, complexes of platinous halides with unsaturated compounds, hexamethyldiplatinum, $PtCl_2$, $PtCl_3$, $PtCl_4$, and $Pt(CN)_3$.

17. The composition of claim 16 where Component (C) is added in an amount giving from 2 to 100 ppm by weight of platinum metal based on the total weight of the composition.

18. The composition of claim 1 where Component (D) has an aspect ratio of at least 3:1.

19. The composition of claim 1 where Component (D) has a number average particle size of about 5 to 15 μm and an aspect ratio greater than about 15:1.

20. The composition of claim 1 where Component (D) comprises 7 to 70 weight percent of the total composition.

21. The composition of claim 1 further comprising (E) is about 10 to 60 weight percent reinforcing filler.

22. The composition of claim 21 where Component (E) comprises a hydrophobic silica, added at from about 10 to about 25 weight percent, based on the total composition.

23. The composition of claim 21 where Component (E) comprises a silicone resin.

24. The composition of claim 23 where the silicone resins consists essentially of M units $R^2R^1{}_2SiO_{1/2}$ and $R^1{}_3SiO_{1/2}$ and Q units $SiO_{4/2}$ where each $R^1$ is independently selected from the group consisting of alkyl, alkenyl, aryl, and halogenated alkyl groups having from 1 to 18 carbon atoms, each $R^2$ is independently selected from the group consisting of hydroxyl, alkoxy, alkenyl, and alkynyl groups.

25. A flame resistant seal formed by curing a liquid silicone rubber composition comprising (A) a liquid polyorganosiloxane polymer described by the formula

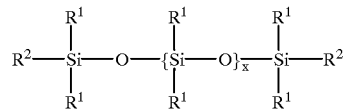

where each $R^1$ is independently selected from the group consisting of alkyl, alkenyl, aryl, and halogenated alkyl groups having from 1 to 18 carbon atoms, each $R^2$ is independently selected from the group consisting of hydroxyl, alkoxy, alkenyl, and alkynyl groups, and x is an integer having a value of from about 10 to 1500, (B) a cross-linking organosilicon compound having at least 3 silicon-bonded reactive groups, (C) a catalyst capable of promoting the reaction between the silicon-bonded $R^2$ groups of Component A and the silicon-bonded reactive group of Component B, and (D) wollastonite.

26. The seal of claim 24, further comprising from 10 to 60 weight percent of a reinforcing filler.

* * * * *